United States Patent [19]
Wu et al.

[11] Patent Number: 5,847,846
[45] Date of Patent: Dec. 8, 1998

[54] APPARATUS AND METHOD FOR SCANNING A BOUND COLOR DOCUMENT USING A WEDGE SHAPED PLATEN

[75] Inventors: Xiaodong Wu, Atherton; David A. Jared, Sunnyvale, both of Calif.

[73] Assignee: Xerox Corporation, Stamford, Conn.

[21] Appl. No.: 635,100

[22] Filed: Apr. 17, 1996

[51] Int. Cl.⁶ .............................. H04N 1/04; H04N 1/46; G03G 15/041; G03G 15/00
[52] U.S. Cl. ......................... 358/475; 358/475; 358/474; 358/505; 399/362; 399/201
[58] Field of Search ................... 358/474, 475, 358/505, 509, 450; 399/362, 201; 355/65, 25, 75

[56] References Cited

U.S. PATENT DOCUMENTS

| | | | |
|---|---|---|---|
| 3,635,557 | 1/1972 | Alderton | 355/65 |
| 3,888,584 | 6/1975 | Smith | 355/75 |
| 4,068,950 | 1/1978 | Kito | 355/75 |
| 4,585,334 | 4/1986 | Malyon | 355/25 |
| 4,645,332 | 2/1987 | Malyon | 355/25 |
| 4,663,873 | 5/1987 | Shinbrot | 40/531 |
| 4,980,720 | 12/1990 | Siegel | 399/52 |
| 5,119,206 | 6/1992 | Rourke et al. | 358/296 |
| 5,212,568 | 5/1993 | Graves et al. | 358/474 |
| 5,276,530 | 1/1994 | Siegel | 358/406 |
| 5,359,207 | 10/1994 | Turner | 257/81 |
| 5,390,033 | 2/1995 | Bannai et al. | 358/498 |
| 5,471,277 | 11/1995 | Fujioka et al. | 355/25 |
| 5,475,505 | 12/1995 | Minasian et al. | 358/474 |

FOREIGN PATENT DOCUMENTS

| | | | |
|---|---|---|---|
| 3546404A1 | of 1993 | Germany | G02B 27/02 |
| 2158599 | of 1985 | United Kingdom . | |

OTHER PUBLICATIONS

U.S. application No. 08/570,791, entitled "Bound Document Imager with Air Jet Page Turning System" to Turner et al., filed on Dec. 12, 1995.

Agarwal, V.K., "Book Copying Apparatus," Xerox Disclosure Journal, vol. 9, No. 6, Nov./Dec., 1984, p. 383.

Guenther,J., "Library Copier," Xerox Disclosure Journal, vol. 12, No. 5, Sep./Oct., 1987, pp. 231–232.

U.S. application No. 08/570,880, entitled "Bound Document Imager with Page Turner" to Turner et al., filed on Dec. 12, 1995.

*Primary Examiner*—Edward L. Coles
*Assistant Examiner*—Twyler M. Lamb

[57] ABSTRACT

A color scanner with a wedge shaped platen sequentially records opposing pages of a bound document positioned thereon using a single imaging station. The scanner includes a partially reflective mirror positioned between the wedge shaped platen. The two sides of the wedge shaped platen are illuminated with polarized light having angles orthogonal to each other. Polarized illuminators operate in combination with polarization analyzers positioned under the wedge shaped platen to sequentially image the opposing pages of the bound document. A controller insures that polarized light sources consisting of the three primary colors red, green, and blue, sequentially expose each opposing page of the bound document. The opposing pages of the bound document are focused through optics onto the single imaging station. In another embodiment, light polarized by analyzers positioned under the wedge shaped platen is filtered by a polarizer positioned in front of the focal optics before reaching the single imaging station. The controller first exposes one side of the platen and then the other to each of the three primary colors red, green, and blue. Digital representations of each primary color are combined to form a single composite image for each opposing page of the bound document. In one arrangement, the imaging station is a two-dimensional array of detectors which sense an image of a page of the bound document projected thereon. In another arrangement, the imaging station is a photoconductive belt which when exposed by the polarized light records a latent image thereon. In either arrangement, a one page imaging station records opposing pages of a bound document either electronically or on print media, one page at a time.

29 Claims, 12 Drawing Sheets

5,847,846

APPARATUS AND METHOD FOR SCANNING A BOUND COLOR DOCUMENT USING A WEDGE SHAPED PLATEN

Cross reference is made to the U.S. patent applications Ser. Nos. 08/635,095 and 08/635,438 filed concurrently herewith, and entitled "Apparatus And Method For Scanning A Bound Document Using A Wedge Shaped Platen", and "Apparatus And Method For Scanning A Bound Document Using A Wedge Shaped Platen With A Moving Mirror", now U.S. Pat. Nos. 5,619,302 and 5,636,006, respectively.

The present invention relates generally to a system for scanning a bound document, and more particularly to a method and apparatus for sequentially scanning opposing pages of the bound document with an imager having an image sensing area sufficient to capture one opposing page of the bound document at a time.

BACKGROUND OF THE INVENTION

With the advent of inexpensive digital storage, recording bound documents in a digital format is an important way of preserving information in books, periodicals, manuscripts, or any other document having a bound edge with a hard or soft cover. Content of a page of a bound document is first scanned and then electronically recorded. The recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted or enhanced with additional information and reproduced on demand as hardcopy using an electronic printing machine such as a laser or ink jet printer.

In order to minimize the stress on the spine of bound documents when capturing or copying image content, wedge or angled platens of scanners and copying machines have been developed. For example, U.S. Pat. No. 3,888,584 to Smith, U.S. Pat. No. 4,068,950 to Kito, and "Book Copying Apparatus," by V. Agarawal, Xerox Disclosure Journal Vol. 9, No. 6, November/December, 1984, p. 383, disclose arrangements for scanning a book on a platen supported horizontally with respect to a support surface. Specifically, an edge of the support surface is arranged to meet a side wall in order that a bound document can be draped over the side of the scanner. While some arrangements provide support for a bound document with a wedge platen having an angle of approximately ninety degrees, other arrangements provide support with wedge platens having angles less than or greater than ninety degrees. For example, Guenther discloses a wedge platen having an angle greater than ninety degrees in "Library Copier," Xerox Disclosure Journal Vol. 12, No. 5, September/October, 1987, pp. 231–232. Alternatively, UK Patent Application GB 2 158 599A, published 1985 to Kobayashi, discloses an electrophotocopier with a wedge platen that is less than ninety degrees.

A principal function of wedge or angled scanning surfaces is to prevent damage to a bound document by minimizing stress applied to its binding as it is held open for scanning in a position as close to the platen of a scanner as possible. Typically when using a flat-bed scanner, a force has to be applied the spine region of a bound document to insure that the document is within the scanner's depth of focus. A wedge or angled platen, however, positions the spine region of a bound document within the scanner's depth of focus without requiring the application of additional force to the document's binding. U.S. Pat. Nos. 4,980,720 and 5,276,530 to Siegel disclose a book scan mode for a flat-bed scanner which minimizes the force typically required to be applied to a binding. In the book scan mode, a page height detector mounted on a scan carriage accounts for the deviation of the book pages from the horizontal platen plane. Alternatively, U.S. Pat. No. 5,475,505 to Minasian et al. discloses a combination flat-bed scanner and wedge shaped scanner. Specifically, Minasian et al. discloses a canted platen input scanner with an adjustable housing support. In a first position, the housing support is canted to facilitate scanning of bound documents, and in a second position the housing support brings the platen to a horizontal position to facilitate scanning other classes of documents.

Additional examples of wedge platens for scanning bound documents include, U.S. Pat. No. 5,359,207 to Turner, German Patent DE-A1 3546404, and U.S. Pat. Nos. 4,585, 334 and 4,645,332 to Malyon. Turner discloses a book scanner with contact imaging that employs two-dimensional sensor arrays that are attached at a common edge and disposed in a wedge shaped manner. German Patent DE-A1 3546404 discloses a roof-shaped book support apparatus for use in a copier application. The optics of the roof-shaped copier arrangement provide that opposing pages of a bound book are simultaneously imaged in the same image plane. Consequently, the roof-shaped book support apparatus must have an imageable area large enough to capture two pages of a bound document at a time. In addition, the roof-shaped copier arrangement adjusts the spacing of the images of both pages in the image plane without having to change the position of the book. Malyon discloses a photocopying device with a V-shaped book rest for supporting and scanning a book in an open condition.

In order to facilitate the copying or reproduction of bound documents a plurality of automatic page turning apparatuses have been developed. Such page turning apparatuses minimize the amount of manual effort required to electronically capture the contents of a bound document. By way of example, U.S. Pat. No. 4,663,873 to Shinbrot, U.S. Pat. No. 5,390,033 to Bannai et al., and U.S. Pat. No. 5,471,277 to Fujioka et al. disclose arrangements for turning pages of a book within a copier. Other page turning arrangements include U.S. patent application Ser. No. 08/570,880 entitled "Bound Document Imager with Page Turner" to Turner et al., filed on Dec. 12, 1995 and assigned to the same assignee as the present invention, and U.S. patent application Ser. No. 08/570,791 entitled "Bound Document Imager with Air Jet Page Turning System" to Turner et al., filed on Dec. 12, 1995 and assigned to the same assignee as the present invention.

Further advances have been made to electronic publishing systems to offer job programming of books on a flat bed scanning system. U.S. Pat. No. 5,119,206 to Rourke et al. discloses a system for printing bound documents. The system can be programmed to scan either a selected side or both sides of the bound document. The attached printing system can then be programmed to print both sides of a page on a common print media sheet or on separate print media sheets. U.S. Pat. No. 5,212,568 to Graves et al. discloses an electronic reprographic apparatus that selectively controls the areas of the document to be imaged. The system enables the user to identify the type of input document so that the potential of imaging beyond document edges or in bound document gutter regions is eliminated.

All references cited above are incorporated herein by reference where appropriate for appropriate teachings of additional or alternative details, features, and/or technical background.

Although the aforementioned wedge scanning systems reduce stress applied to bound edges of documents, most wedge scanning systems scan a single page of a bound document at a time and require that the bound document is repositioned before the opposing page is scanned since only one face of the wedge scanning system is used to record image data. In contrast, other scanning systems such as that disclosed in German Patent DE-A1 3546404 do not require repositioning a bound document in order to image both sides. However, such a scanning system requires an image sensing area sufficiently large to simultaneously capture both pages of the bound document. Similarly, the aforementioned wedge contact scanning system disclosed by Turner requires two two-dimensional flat panel detectors to image opposing pages of a bound document without having to repositioning it in order to scan both sides. In addition, such contact imaging arrangements have a reduced depth of focus since it is difficult to provide contact sensors with thin yet durable surface protection. Accordingly, it would be desirable to provide a wedge scanning system with an increased depth of focus. In addition, it would be desirable to provide a wedge scanning system that does not require repositioning a bound document while sequentially imaging opposing sides of the bound document using a sensing area that captures a single opposing page of a bound document at a time.

SUMMARY OF THE INVENTION

In accordance with one aspect of the invention, there is provided an apparatus for scanning a bound document. The apparatus includes a wedge shaped platen with a first transparent surface and a second transparent surface for supporting the bound document in an open condition. A light source illuminates a first opposing page and a second opposing page of the bound document positioned on the first and the second transparent surfaces of the wedge shaped platen. A first polarizer polarizes light emitted by the light source to illuminate the first opposing page with light polarized at a first angle. A second polarizer for polarizing light emitted by the light source to illuminate the second opposing page with light polarized at a second angle. An imager records the first and the second opposing pages of the bound document on the wedge shaped platen one page at a time. A beamsplitter is positioned in a defined transmissive optical path between the first transparent surface and the imager, and is positioned in a defined reflective optical path between the second transparent surface and the imager. The beamsplitter transmits onto the imager light polarized at the first angle, and reflects onto the imager light polarized at the second angle.

In accordance with another aspect of the invention, there is provided a method for scanning a bound document supported on a wedge shaped platen having a first transparent surface and a second transparent surface. The method includes the steps of: positioning a beamsplitter in a defined transmissive optical path between the first transparent surface and an imager, and in a defined reflective optical path between the second transparent surface and the imager; illuminating a first opposing page of the bound document positioned on the first transparent surface of the wedge shaped platen with light polarized at a first angle; recording with the imager a representation of the first opposing page illuminated along the defined transmissive optical path; illuminating a second opposing page of the bound document positioned on the second transparent surface of the wedge shaped platen with light polarized at a second angle; and recording with the imager a representation of the second opposing page illuminated along the defined reflective optical path.

BRIEF DESCRIPTION OF THE DRAWINGS

These and other aspects of the invention will become apparent from the following description which illustrates preferred and alternative embodiments of the invention read in conjunction with the accompanying drawings wherein the same reference numerals have been applied to like parts and in which.

DETAILED DESCRIPTION

Figure 1:
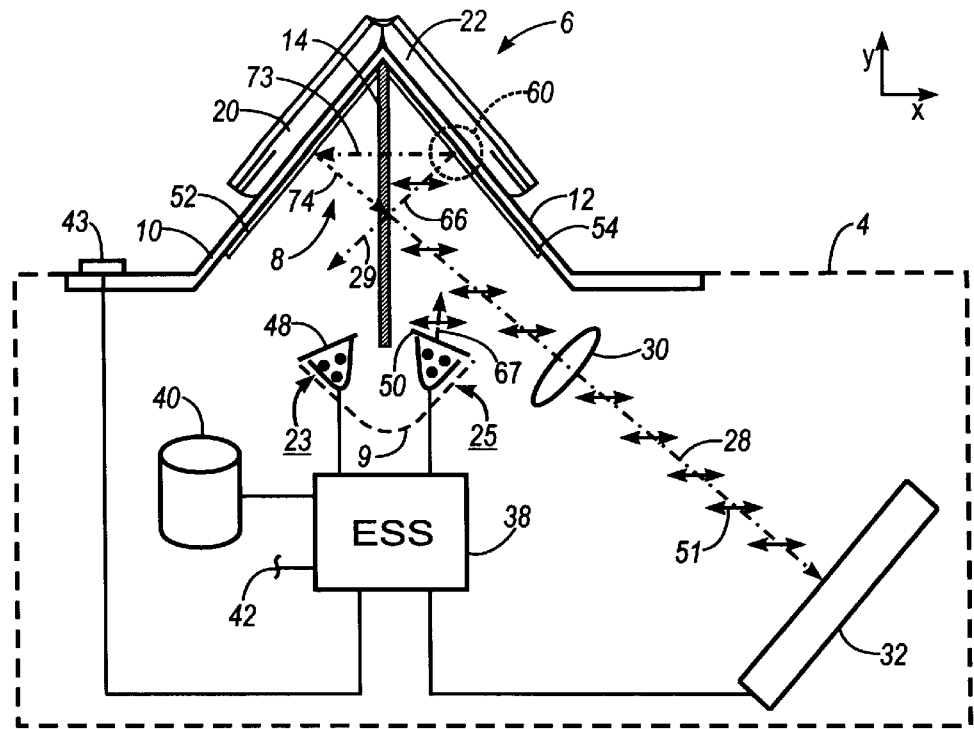
FIG. 1 illustrates a scanning system incorporating the present invention showing a first opposing page of a bound document supported on a wedge shaped platen being recorded by an imager.
Figure 2:
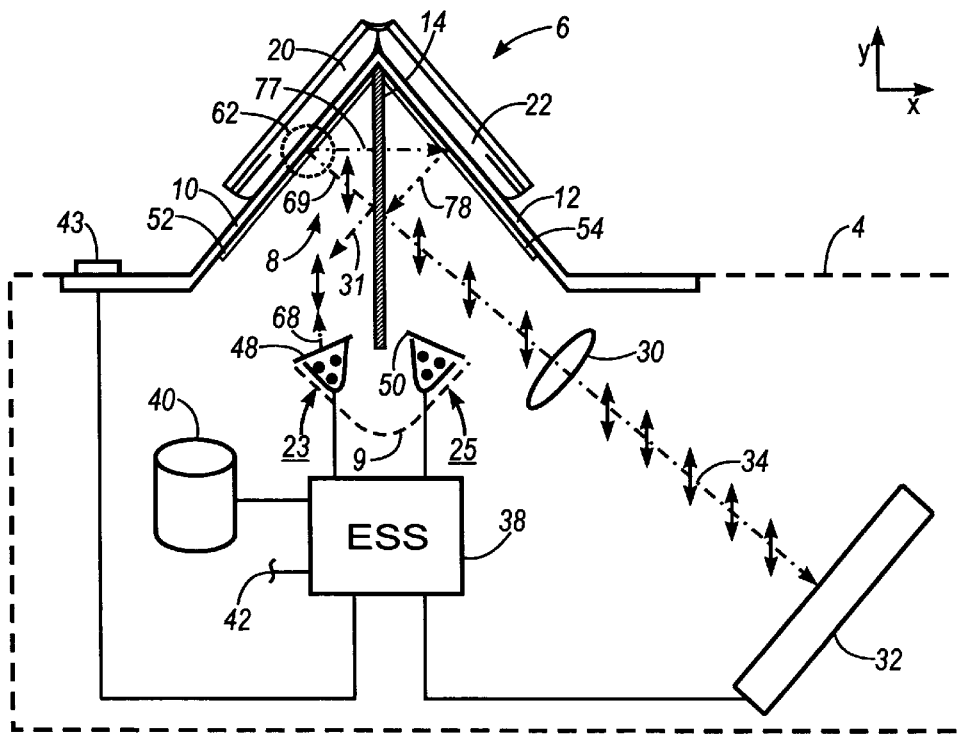
FIG. 2 is the scanning system shown in FIG. 1 showing a second opposing page of a bound document supported on a wedge shaped platen being recorded by the imager.

Referring now to the drawings where the showings are for the purpose of describing the preferred embodiment of the invention and not for limiting same, FIGS. 1 and 2 show a scanning system 4 incorporating the present invention. Scanning system 4 includes a wedge shaped platen 8 adapted for scanning a bound document 6. Bound document 6 is defined herein as any document having a bound edge such as a book or a periodical. The wedge shaped platen 8 includes a first face 10 and a second face 12 for holding bound input documents in an open position for scanning. Faces 10 and 12 of platen 8 are transparent and can be formed, for example, with any clear glass or plastic. The angled shape of the wedge shaped platen 8 advantageously minimizes stress to the spine region of bound documents when scanning. Unlike flat bed scanners, an angled platen does not require additional pressure to the spine region of a bound document in order for scanned pages to be within the depth of focus of scanning system 4.

Figure 3:
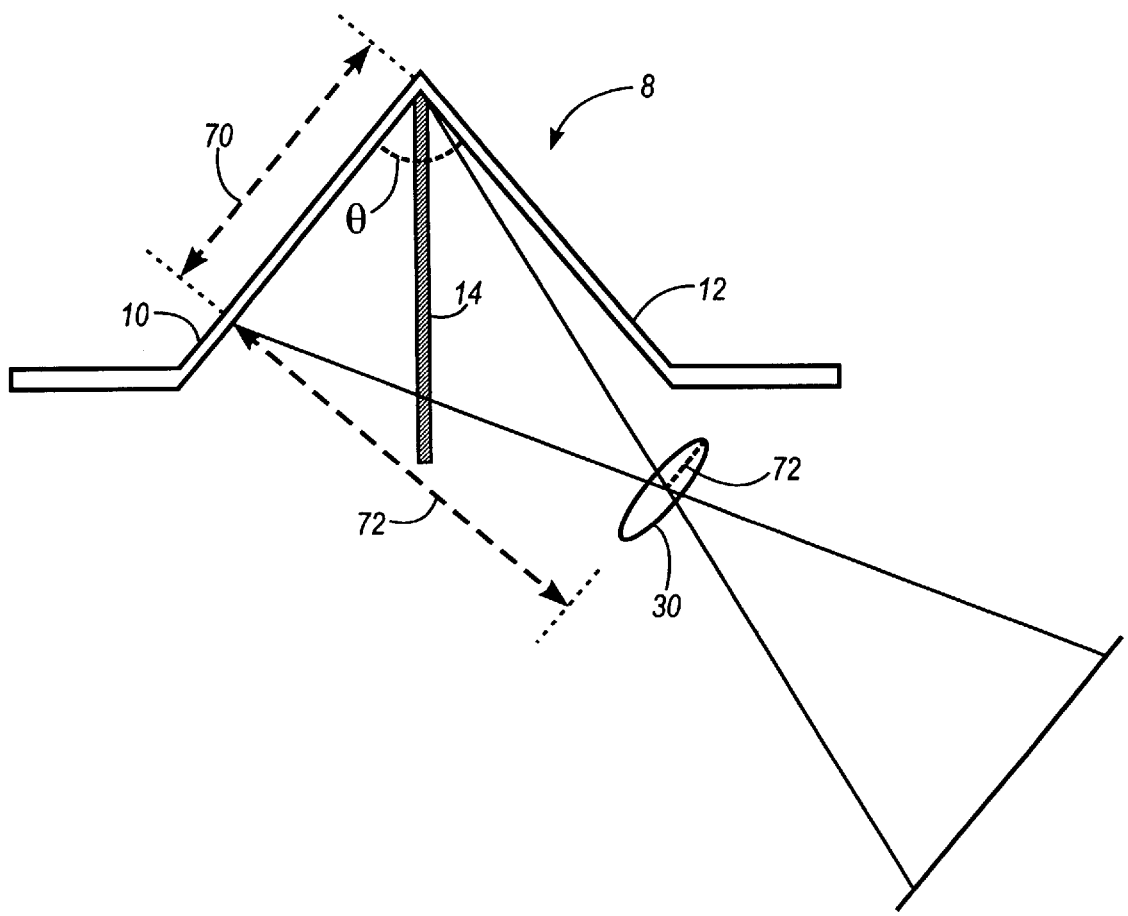
FIG. 3 illustrates physical constraints of one embodiment of the scanning system shown in FIGS. 1 and 2.

With reference now to FIG. 3, constraints of the angle of wedge shaped platen 8 of the scanning system 4 are shown in detail. Generally, angle θ between face 10 and face 12 of wedge platen 8 is defined to be less than ninety degrees in order that a bound document being imaged on wedge shaped platen 8 is open as little as possible. It will, however, be understood by those skilled in the art that wedge platen 8 can operate with an angle θ that is greater than or equal to ninety degrees. By minimizing the extent to which a bound document is opened while scanning the pressure to the spine region of a bound document is minimized. The angle θ is minimized to the extent that the wedge shaped platen 8 does not interfere with the projection path of scanning system 4, which is described in detail later.

In a preferred embodiment, the angle θ shown in FIG. 3 is selected such that the outermost ray of light reflecting off of mirror 14 or side 10 of platen 8 is not eclipsed by side 12 of platen 8 from transmitting through lens 30. Assuming a one-to-one projection, the angle θ is constrained to be greater than or equal to the arctan$[2f/(L/2-r)]$, where "2f" is indicated generally by reference number 71, "f" is indicated generally by reference numeral 72, and where "L" is indicated generally by reference number 70. Specifically, "f" is defined herein as the focal length of lens 30, "r" is defined herein as the radius of lens 30, and "L" defined herein as the width of the sensing area on each face 10 and 12 of wedge platen 8. Thus, the size of angle θ between face 10 and 12 of wedge shaped platen 8 is optimal when it minimizes the stress on the spine of a bound document while not interfering with the projection path of the imaging system.

Figure 4:
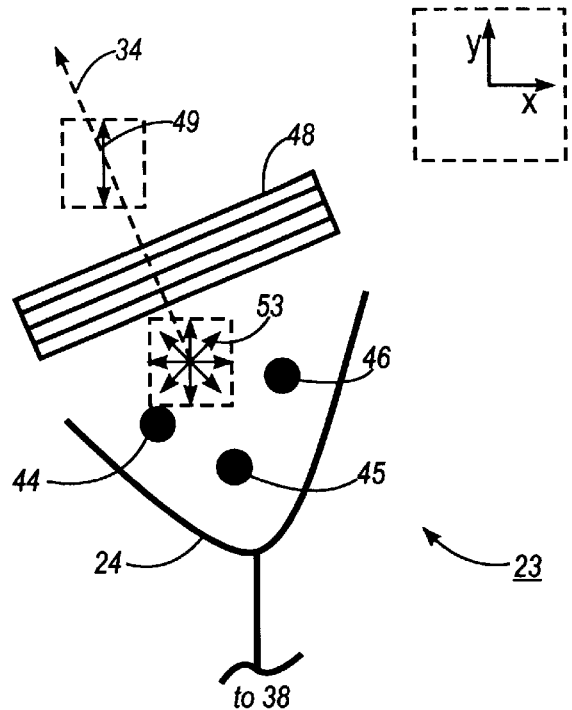
FIGS. 4 and 5 are detailed illustrations of the light sources 23 and 25 shown in FIGS. 1 and 2.
Figure 5:
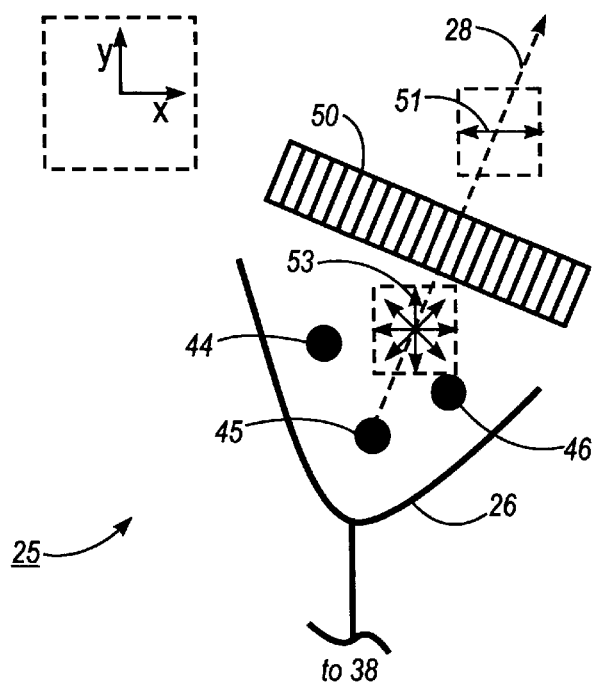

Pages of sides 20 and 22 of bound document 6 resting face down on platen 8 are illuminated by flash lamps or light sources 23 and 25, respectively. The light sources 23 and 25, which are shown in more detail in FIGS. 4 and 5, include reflectors 24 and 26, respectively. In addition, each light source 23 and 25 includes three individual light sources 44, 45, and 46. Each of the three individual light sources selectively emits a primary color of light (i.e. red, green, and blue (RGB)). It will be appreciated, however, by those skilled in the art that light sources 23 and 25 can comprise any lighting arrangement suitable for recording color or black and white images. Thus, light source 23 can be any arrangement that emits white light, a single primary color, or a combination of primary colors. The specific light source used in any embodiment depends on the type of input document (e.g. color or black and white) and the form of a recorded image (e.g. colors or gray scale). Polarizers 48 and 50, which are positioned in front of light sources 23 and 25, respectively, polarize non-polarized light, indicated generally by star cluster 53, emitted therefrom at different angles. It will be appreciated by those skilled in the art that non-polarized light is being illustratively diagrammed in the Figures using star cluster 53 to represent a spectrum of polarization of electromagnetic radiation that is visible. It will also be appreciated by those skilled in the art that polarizers 48 and 52 are illustratively diagrammed in FIGS. 4 and 5 to symbolically represent polarizers that polarize light at angles orthogonal to each other, and that in reality polarizers do not appear as illustrated in FIGS. 4 and 5 but have properties that permit one angle of light or another to transmit therethrough. Specifically, FIG. 4 illustrates light being polarized at an angle parallel to the y-axis which is shown symbolically using arrow 49, and FIG. 5 illustrates light being polarized at an angle parallel to the x-axis which is shown symbolically using arrow 51..

It will be readily understood by those skilled in the art that any number of lighting arrangements can be used to carry out the present invention. In the preferred embodiment, light sources 23 and 25 are in separate housings. In an alternate embodiment, light sources 23 and 25 are contained in a single housing as shown generally by reference numeral 9. In another embodiment, one of the light sources 23 or 25 selectively projects light to side 10 or side 12 of platen 8 by either physically moving between two preset positions from one side or the other or by controlling light transmitted through each polarizer 48 and 50 with a shutter. In either case, one of the light sources 23 or 25 selectively illuminates either polarizer 48 or polarizer 50. It will also be understood that there exist a number of ways in which light can be polarized and that any method of polarization will suffice for the purposes of the present invention so long as light polarized by polarizer 48 is distinguishable from light polarized by polarizer 50. For example, it will also be understood by those skilled in the art that besides linear polarization, light can be polarized to circular or elliptical states. (For a description of polarization components see 1995/96 Product Catalogue by Melles Griot® pages 12-1 through 12-36.)

With reference again to FIGS. 1 and 2, a beamsplitter, or two way mirror, 14 divides the wedge platen 8 and splits light beams incident thereon into a reflected beam and a transmitted beam. A beamsplitter or reflective mirror can be formed using a thin glass plate or a prism or by depositing on one side of a glass substrate a thin semitransparent metallic or dielectric film. (For a description of beamsplitters see 1995/96 Product Catalogue by Melles Griot® pages 11-1 through 11-22.) Light reflecting off of pages 20 and 22 supported on sides 10 and 12 of wedge platen 8 originates from a common source so that imager 32 (which is described in detail later) cannot distinguish light from one or the other. A properly calibrated scanning system produces equivalent output when the same document is scanned on support 10 and subsequently on support 12. In one properly calibrated embodiment, light sources 23 and 25 emit light at comparable intensities and mirror or beamsplitter 14 is made of a low absorption material that reflects 50% and transmits 50% of light incident thereon. It will be understood, however, by those skilled in the art that other embodiments can be properly calibrated so long as the intensity of light sources 23 and 25 of each embodiment varies depending on the reflectance to transmittance ratio of mirror 14. For example, if the intensity of light source 23 is greater than the intensity of light source 25, the ratio of reflectance to transmittance of mirror 14 should be greater than one (i.e. assuming a common source the percentage of reflected light is greater than the percentage of transmitted light). Thus, a properly calibrated scanning system 4 balances the intensities of light emitted by sources 23 and 25 with the reflectance and transmittance ratio of mirror or beamsplitter 14.

Since light originating from either lamp 23 or lamp 25 is partially reflected and partially transmitted by mirror 14, polarization analyzers 52 and 54 are positioned on the sides 10 and 12 of wedge platen 8, respectively, to prevent light partially reflected from interfering with light partially transmitted, and vice versa. Polarization analyzers 52 and 54 are functionally identical to the polarizers 48 and 50, respectively, in that light is polarized at the one angle by polarizers 52 and 48 and at another angle by polarizers 54 and 50. The purpose of polarization analyzers 52 and 54 is to ensure that light from lamp 23 polarized by polarizer 48 only illuminates side 20 of bound document 6, and light from lamp 25 polarized by polarizer 50 only illuminates side 22 of bound document 6. In other words, polarization analyzers 52 and 54 serve to block light from either one side or the other of bound document 6 depending on the side being recorded by imager 32. In addition, polarization analyzers 52 and 54 serve to re-polarize light in the event polarized light is de-polarized after diffuse reflection off of sides 20 and 22 of bound document 6.

More specifically, FIG. 1 shows an example of light from lamp 25 illuminating side 12 of platen 8 that has been polarized by polarizer 50. A ray of light 66 that is incident on mirror 14 is split into reflected ray 28 and transmitted ray 29. Another ray of light 73 is shown partially transmitting through mirror 14 and partially reflecting back on itself. Absent polarization analyzer 52, ray of light 73 would reflect off of side 20 of bound document 6 as ray of light 74 and partially transmit through mirror 14 thereby interfering with ray 28. However, because polarization analyzer 52 polarizes light at a different angle from the angle at which ray 73 is polarized, ray 74 is absorbed by analyzer 52 before reflecting off of side 20 of bound document 6. In contrast, FIG. 2 shows an example of light from lamp 23 illuminating side 10 of platen 8 that has been polarized by polarizer 48. A ray of light 69 incident on mirror 14 is split into reflected ray 31 and transmitted ray 34. Another ray 77 is shown partially transmitting through mirror 14 and partially reflecting back on itself. Absent polarization analyzer 54, ray of light 77 would reflect off of side 22 of bound document 6 as ray of light 78 and partially reflect off of mirror 14 thereby interfering with ray 34. However, because polarization analyzer 54 polarizes light at a different angle from the angle at which ray 77 is polarized, ray 77 is absorbed by analyzer 54 before reflecting off of side 22 of bound document 6. Consequently, polarization analyzers 52 and 54 prevent transmission of incorrectly polarized light through two-way mirror 14 so that imager 32 can sequentially record light reflecting from both sides of bound document 6.

Figure 6:
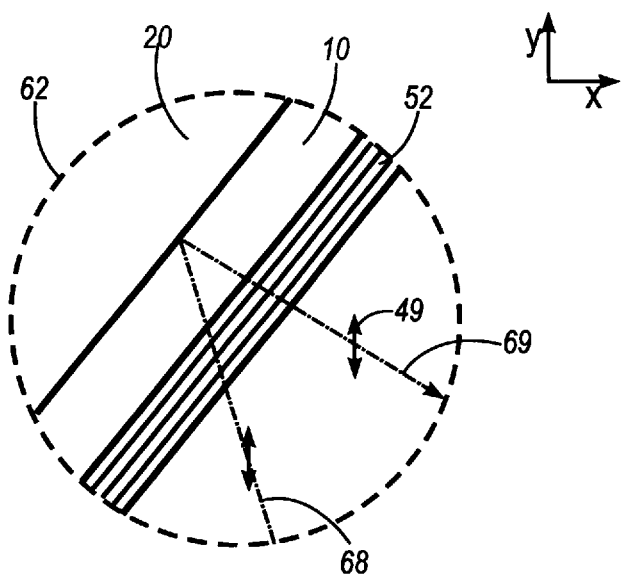
FIGS. 6 and 7 are detailed illustrations of the areas 62 and 60 shown in FIGS. 1 and 2, respectively.
Figure 7:
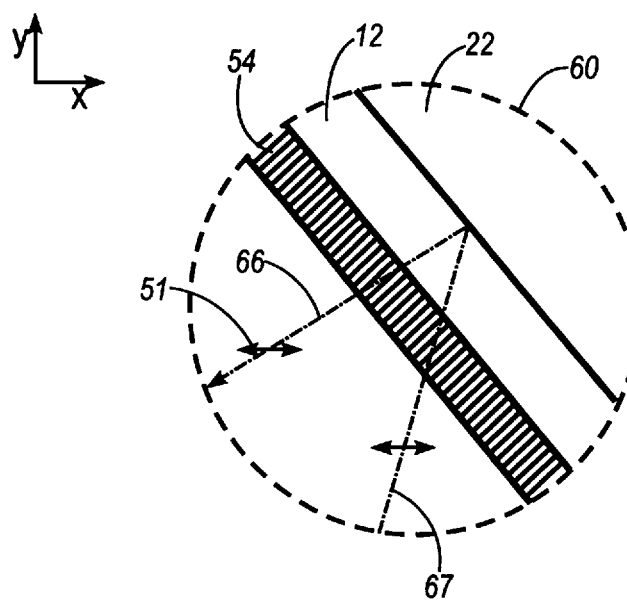

FIGS. 6 and 7 show blow-ups of details 60 and 62 shown in FIGS. 1 and 2, respectively. Details 60 and 62 illustrate that light incident on polarizer analyzers 54 and 52 needs to be properly polarized to reflect off of pages 20 and 22, respectively. Blow-up 60, shown in FIG. 7, illustrates that light ray 67 incident on polarizer analyzer 54 reflects off of side 12 of page 22 as light ray 66 when light is polarized at an angle consistent with light polarized by polarizer 50. Similarly, blow-up 62, shown in FIG. 6, illustrates that light ray 68 polarized at an angle consistent with polarizer 48 is transmitted through analyzer 52 and is reflected as light ray 69. In accordance with this aspect of the invention, the angle at which light is polarized by polarizers 48 and 50 must correspond to the angle at which analyzers 52 and 54, respectively, polarize light. In addition, polarization analyzers 52 and 54 re-polarize light that may be de-polarized after diffusely reflecting off of sides 20 and 22 of bound document 6. More specifically, polarized light rays 68 and 67 incident on sides 20 and 22, respectively, may reflect as non-polarized light. In accordance with another aspect of the invention, polarization analyzers 52 and 54 serve to re-polarize the light rays 68 and 67 if they have been depolarized, as illustrated by reflected rays 69 and 66 respectively. It will be understood, however, that light incident on sides 20 and 22 of bound document 6 is diffusely reflected therefrom, and that rays 69 and 66 which represent part of the diffusely reflected light, are illustrated herein for the purpose of describing the present invention.

With reference again to FIGS. 1 and 2, flash lamps 25 and 23 are shown illustratively illuminating sides 22 and 20 of bound document 6, respectively. Polarizers 48 and 50 in combination with polarizer analyzers 52 and 54 enable light from lamps 23 and 25 to be selectively reflected off of each side of bound document 6 and onto imager 32 in accordance with the invention. With reference initially to FIG. 1, flash lamp 25 illuminates side 22 of bound document 6 with a short-lived flash of light from a selected light source 44, 45, or 46 that, when reflected off side 22, travels along a path depicted generally by ray 28. As noted above, light emitted from either of light sources 44, 45, or 46 of lamp 25 is polarized at an angle parallel to the x-axis as it passes through polarizer 50 (as illustrated symbolically by arrows 51). As a result, light is polarized at a predetermined angle by polarizer 50 (as represented generally by ray 67). The polarized light then passes through polarizer analyzer 54 which transmits light polarized at the predetermined angle, before reflecting off of side 22 of bound document 6. Reflected illumination from side 22 travels along a path depicted generally by ray 66, before partially reflecting off two-way mirror 14 as ray 28 or partially transmitting through two-way mirror 14 as ray 29. Light reflecting off of two-way mirror 14 is projected by focal optics 30 onto sensor array or imager 32. As noted above, analyzer 52 insures that ray 29 transmitted through mirror 14 does not reflect off of side 20 and interfere with light reflecting off of side 22.

With reference now to FIG. 2, flash lamp 23 illuminates side 20 of bound document 6 with a short-lived flash of a light from a selected source 44, 45, or 46 that, when reflected off side 20, travels along a path depicted generally by polarized ray 34. As noted above, light emitted from lamp 23 is polarized by polarizer 48 at an angle different from light emitted from lamp 25 and polarized by polarizer 50. For example, unlike polarized ray 28 shown in FIG. 1 which is polarized at an angle parallel to the x-axis (indicated generally by arrows 51) by polarizer 50 positioned in front of lamp 25, polarized ray 34 shown in FIG. 2 is polarized at an angle parallel to the y-axis (indicated generally by arrows 49) by polarizer 48 positioned in front of lamp 23. Initially, light is polarized by polarizer 48 (indicated generally by ray 68). The polarized light is subsequently transmitted by polarizer analyzer 52. Reflected illumination from side 20 traveling along a path depicted generally by ray 69 is partially transmitted through mirror 14 as indicated generally by ray 34 and partially reflected as indicated generally by ray 31. Light transmitting through two-way mirror 14 is focused by optics 30 and projected onto imager 32. Similar to analyzer 54, analyzer 52 only transmits polarized light having an angle that is equivalent to the angle of light polarized by its respective polarizer, namely polarizer 48. As noted above, analyzer 54 blocks any rays transmitted through mirror 14, such as ray 77, which would otherwise illuminate side 12 and constructively interfere with imager 32 while imaging opposing side 20 of bound document 6.

Image data that is detected by the single page imager 32 has either been reflected by or transmitted through mirror 14. It will be appreciated by those skilled in the art that any sensor array or imager 32 that is adapted to record documents in contact with either side 10 or side 12 of wedge shaped platen 8 will suffice for the purposes of the present invention. The present invention operates using an active or a passive imaging system that detects a single page of a bound document sensed thereon. In the preferred embodiment, imager 32 is an array of active photosensor that converts optical image data represented by beams 28 or 34 into electrical image signals. Active photosensor arrays include imagers such as a flat panel detector, and a charge coupled device (CCD). As a flat panel detector, imager 32 comprises an array of thin film transistors and sensors that function as pixel element detectors. These thin film elements are generally constructed over a translucent substrate such as glass, forming a two dimensional detecting surface. An example of the thin film arrays are disclosed in U.S. Pat. No.

5,017,989 to Street et al., the pertinent portions of which are incorporated herein by reference. Alternatively, imager 32 can comprise a two-dimensional CCD photosensitive array, or a one-dimensional CCD photosensitive array that sequentially scans each side of the image plane using a movable optical carriage system. An example of a scanning carriage system using a CCD is disclosed in U.S. Pat. No. 5,276,530, the pertinent portions of which are incorporated herein by reference.

Once an image is projected from either side 20 or 22 of bound document 6 onto imager 32, electrical representations are read out of array 32 by suitable electronics in the form of digital image data and transmitted to an electronic subsystem (ESS) 38. At the ESS 38, the digital image data may either undergo further image processing or it may be stored on a storage device 40 which may include RAM, flash memory, floppy disk, or another form of optical or magnetic storage. Generally, ESS 38 includes a microprocessor and control software responsive to user or system demand for the processing and routing of image data. Image data stored on storage device 40 can be transmitted by ESS 38 through port 42 to other devices such as an electronic printer or facsimile for hard copy reproduction.

In an alternate embodiment, imager 32 comprises a passive photosensor such as a photoreceptor, or photographic film, or any other material that is sensitive to light. As a photoreceptor, imager 32 is regulated by ESS 38 which uses operating software stored in a memory (not shown) to control various stations (not shown) of imager 32. Generally, the photoreceptor is in the form of a movable belt or drum which is charged at a charging station to a relatively high, substantially uniform potential. Next, the charged photoconductive belt is advanced through imaging station 32 at which light rays reflected from one of the pages of the bound document 6 being copied on wedge shaped platen 8, as described above, create an electrostatic latent image on the photoconductive surface.

In the event imager 32 is a photoreceptor, ESS 38 must insure that the intensity of flash lamps 23 and 25 is sufficient to expose the surface of the photoreceptor, and that the speed at which the photoreceptor belt or drum is traveling is matched to the duration of the flash exposure. If the speed of the belt or drum is too great then excessive blurring of the latent image will occur. Subsequently, the electrostatic latent image is developed at a development station by a developer unit, such as a magnetic brush development unit, (not shown) and the developed image is transferred at a transfer station to a copy sheet supplied from a paper tray (not shown). Following transfer, the copy sheet bearing the transferred image is fed to a fusing station where a fuser (not shown) permanently affixes the toner powder image to the copy sheet. Such electrophotographic systems are well known in the art, an example of which is disclosed in U.S. Pat. No. 5,322,970, the pertinent portions of which are incorporated herein by reference.

In operation, ESS 38 is coupled to flash lamps 23 and 25, storage device 40, output port 42, scan switch mechanism 43 and imager 32. After detecting a start scan signal from switch 43, ESS 38 acts as a driver to each coupled component for synchronous flash exposure of side 20 and 22 of bound document 6 using lamps 23 and 25, respectively. Also, ESS 38 insures proper timing between exposures by lamps 23 and 25 so that previously sensed image data is fully recorded on storage device 40 before subsequent exposure of imager 32 to a new image.

Figure 8:
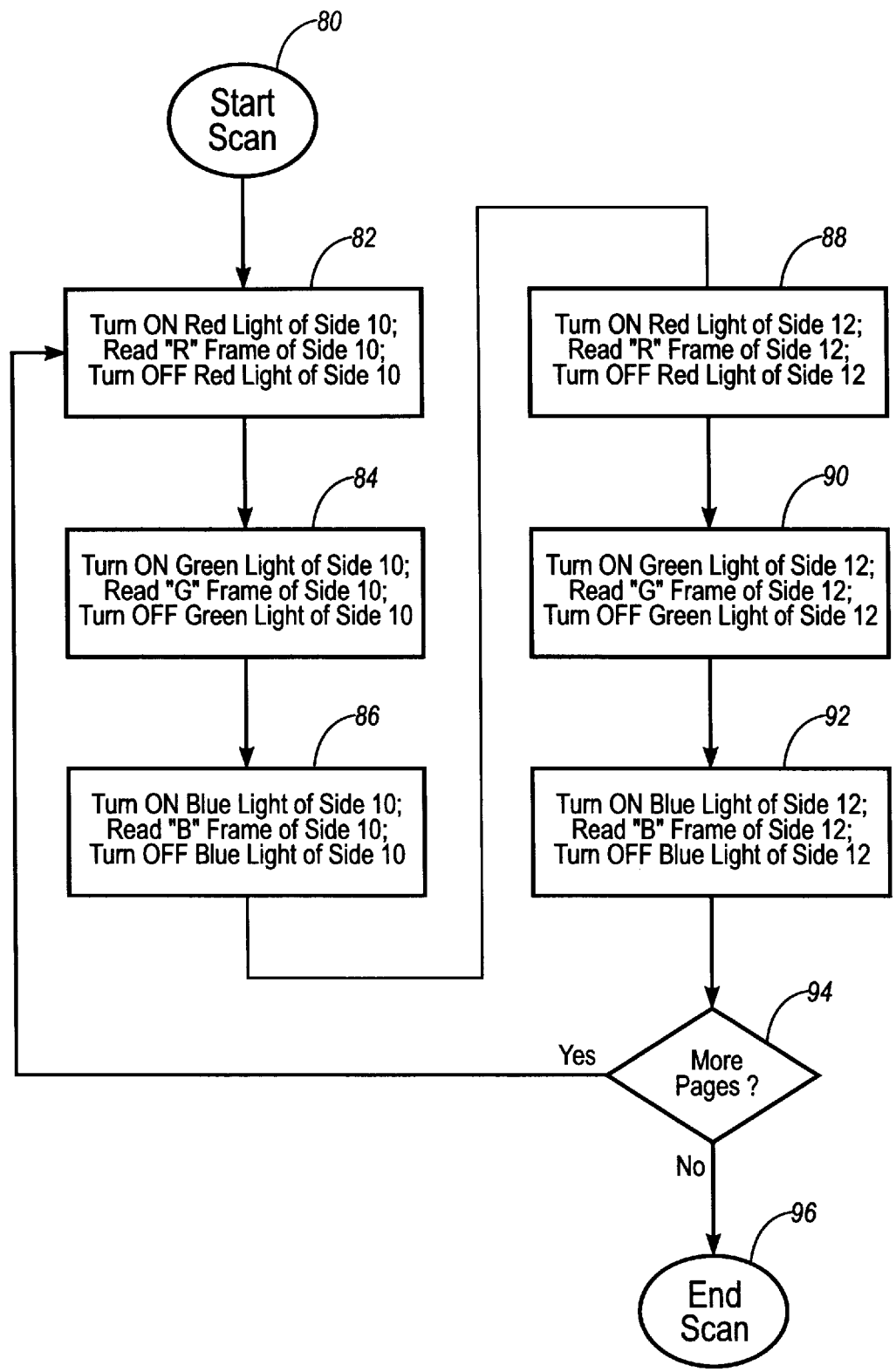
FIG. 8 is flow chart showing the general steps involving the operation of the scanning system.

FIG. 8 is a flow diagram illustrating control steps of scanning system 4 in operation. At step 80, ESS 38 senses that scan switch mechanism 43 has been invoked by an operator. Subsequently at step 82, ESS 38 turns ON red light source 44 of lamp 23 (shown in FIGS. 4 and 5) to illuminate side 10 of platen 8. After exposure of light polarized at an angle set by polarizer 48, ESS 38 reads a digital representation of side 20 of bound document 6 from imager 32. The digital representation defining parts of side 20 of bound document 6 sensitive to red light is either stored on storage device 40 or output through port 42 as described above. Once captured, the red light source 44 is turned OFF. Steps, 84 and 86 are similar to step 82 except that green light source 45 and blue light source 46 of lamp 23 (shown in FIG. 4) are substituted for the red light source 44. After completing steps 82, 84, and 86 for each of the red, green, and blue primary colors, the three digital representations for each primary color are combined to derive an image having both intensity and color hue of side 20 of document 6.

With continued reference to FIG. 8, subsequent to steps 82, 84, and 86, corresponding steps 88, 90, and 92 are performed on side 12 of platen 8 using the red, blue, and green light sources of lamp 25. After completing steps 88, 90, and 92, an image having both intensity and color hue of side 22 of document 6 is recorded on storage device 40 or output through port 42 as coordinated by ESS 38. At step 94, ESS 38 determines whether more pages are to be scanned by detecting a signal from switch mechanism 43. After step 94 and before repeating step 82, it is assumed that an operator will turn the page of bound document 6 before invoking the scan switch 43. If no scan signal is detected from switch mechanism 43, ESS 38 remains in a ready scan state at step 96.

It will be readily understood by those skilled in the art that steps 82, 84, 86, 88, 90, and 92 can be performed in any order so long as ESS 38 correctly combines images representing the primary colors of each respective side once all the steps have completed. It will also be understood by those skilled in the art that scanning system 4 can be readily modified to have imager 32 record gray scale representations of color or black and white images. To record a black and white image, a single illumination and recording step is performed for steps 82, 84, and 86, and correspondingly a single step is performed in place of steps 88, 90, and 92. Specifically, the single step consists of recording a gray scale representation of sides 10 and 12 after exposing each side with white light, or with one of or a combination of the three primary colors red, green, or blue.

Figure 9:
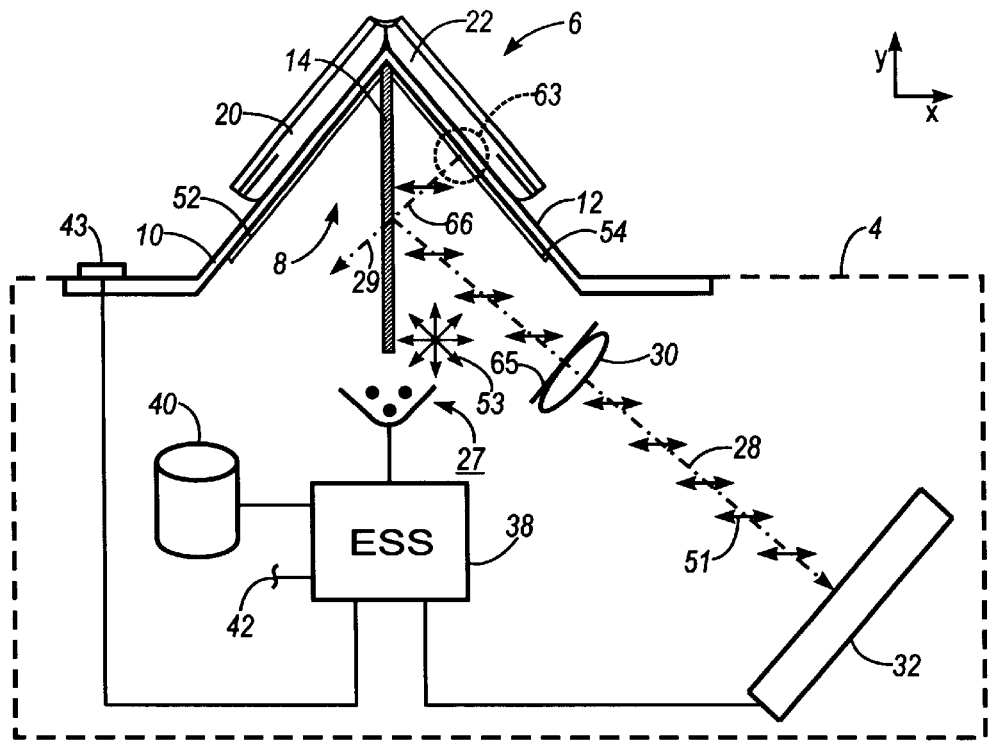
FIGS. 9 and 10 illustrate an alternate embodiment of the scanning system shown in FIGS. 1 and 2, respectively.
Figure 10:
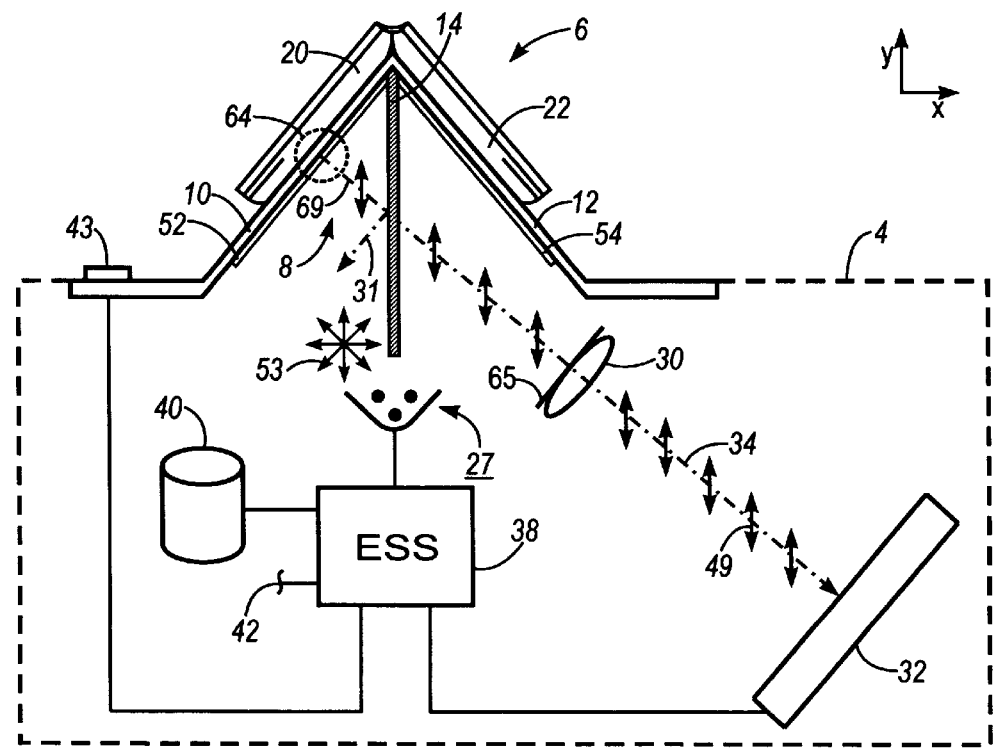
Figure 11:
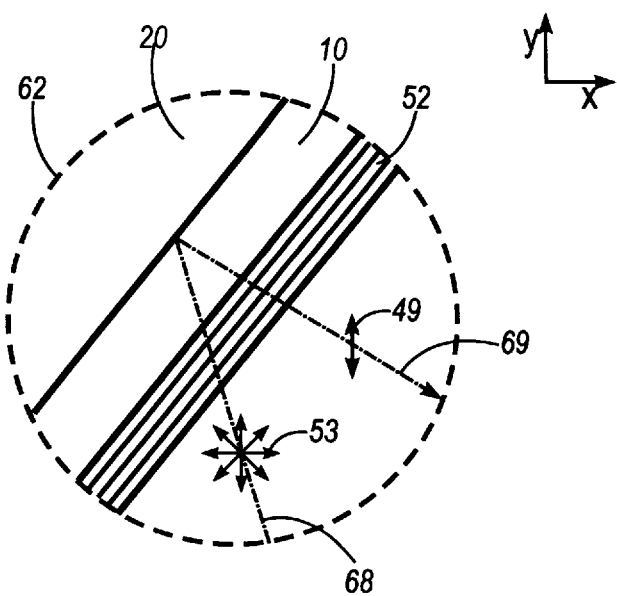
FIGS. 11 and 12 are detailed illustrations of the areas 64 and 63 shown in FIGS. 9 and 10, respectively.
Figure 12:
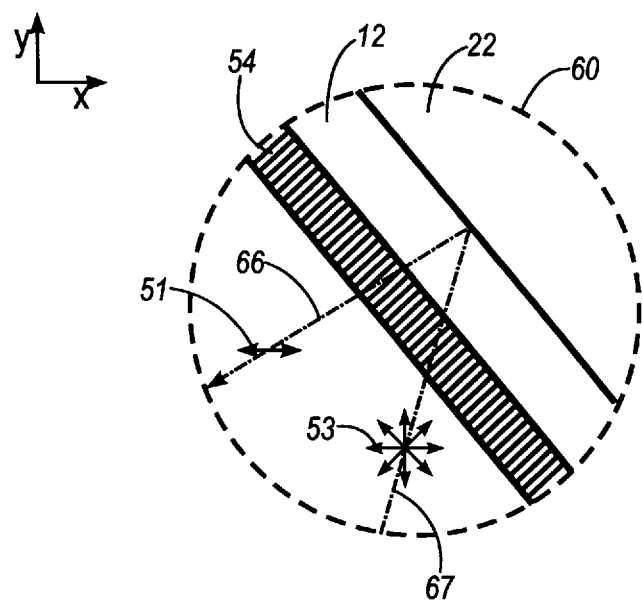

FIGS. 9 and 10 illustrate an alternate embodiment of the scanning system shown in FIGS. 1 and 2, respectively. In the alternate embodiment, polarizer 65 shown in FIGS. 9 and 10 is substituted for the polarizers 48 and 50 shown in FIGS. 1 and 2. In the alternate embodiment, light source 27 illuminates both sides 10 and 12 with non-polarized light as indicated generally by the star cluster 53. It will be understood, however, by those skilled in the art that single light 27 can be substituted with two light sources that individually illuminate sides 10 and 12 as shown in FIGS. 1 and 2. The non-polarized light from light source 27 is polarized by polarization analyzers 52 and 54 before reflecting off of pages 20 and 22, respectively. As illustrated in detail in FIGS. 11 and 12, polarization analyzer 52 polarizes light at an orthogonal angle to polarization analyzer 54, respectively. In FIG. 11, non-polarized light ray 53 reflects off of side 20 as light ray 69 polarized at an angle indicated generally by arrow 49. In FIG. 12, non-polarized light ray 53 reflects off of side 22 as light ray 66 polarized at an angle indicated generally by arrow 51. To separate the polarized light before reaching imager 32, polarizer 65 is positioned in front of focal optics 30.

Figure 13:
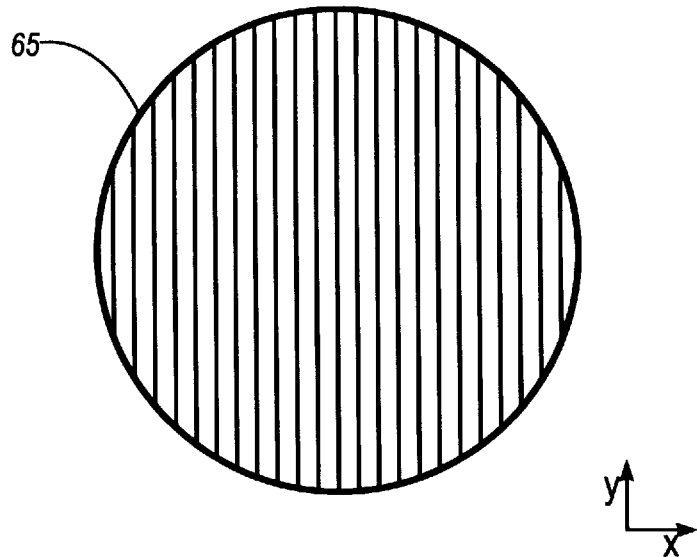
FIGS. 13 and 14 show side views of the polarizer 65 in the two operational positions shown in FIGS. 9 and 10, respectively.
Figure 14:
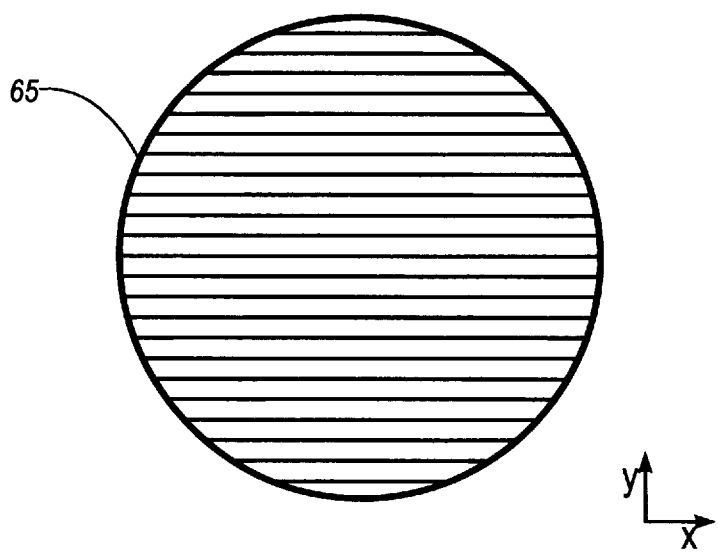
Figure 15:
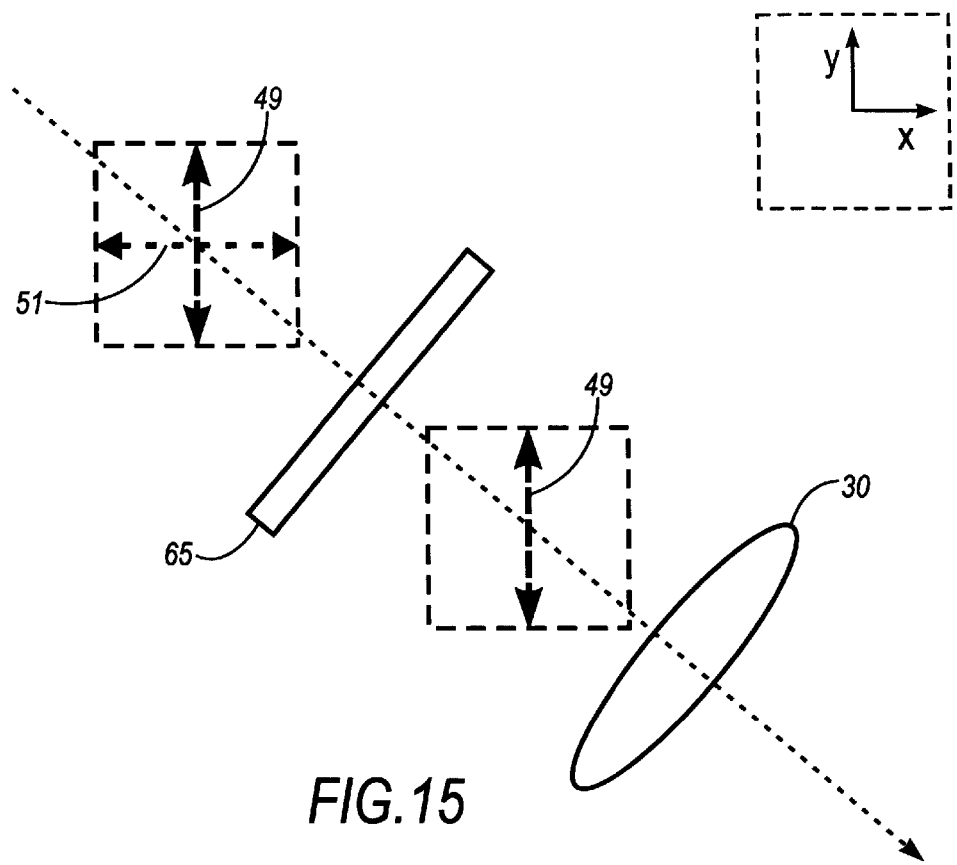
FIG. 15 illustrates the polarizer 65 shown in FIGS. 11 and 12 in the first operational position shown in FIG. 13.
Figure 16:
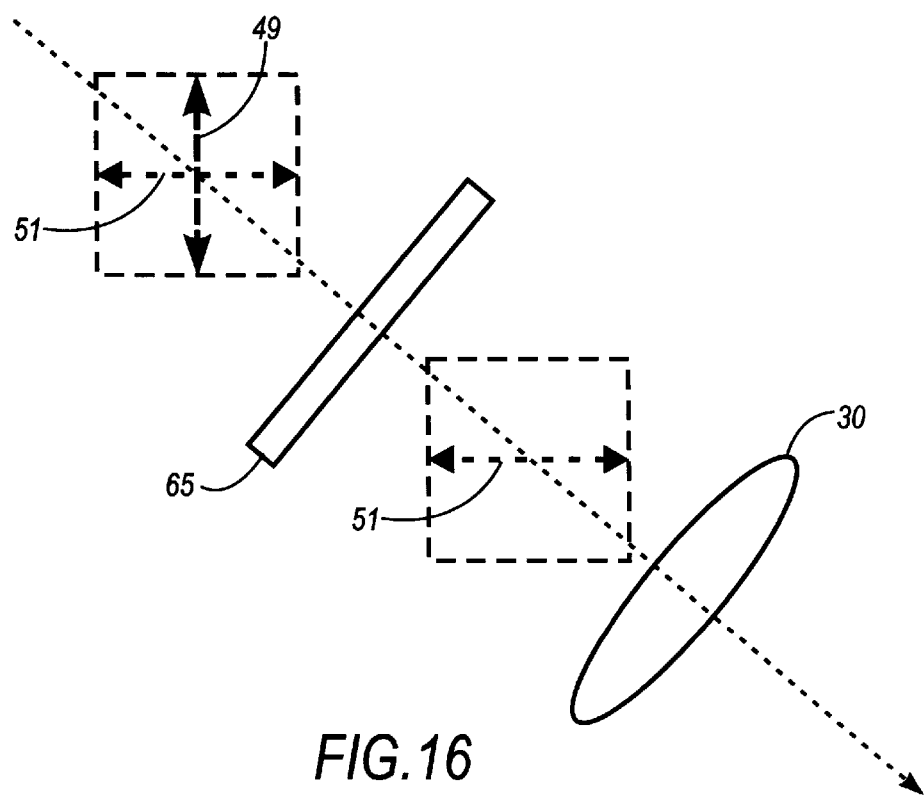
FIG. 16 illustrates the polarizer 65 shown in FIGS. 11 and 12 in the second operational position shown in FIG. 14.

In operation, polarizer 65 rotates between a first operational position and a second operational position as shown in FIGS. 13 and 14, respectively. Polarizer 65 is rotated between the two positions depending on whether side 10 or side 12 is being recorded by imager 32. The effect of rotating polarizer 65 is illustrated in FIGS. 15 and 16. In both FIGS. 15 and 16 light incident on polarizer 65 is polarized at angles orthogonal to each other as illustrated by arrows 49 and 51. This aspect of the invention enables one imager 32 to sequentially record sides 20 and 22 of bound document 6 by positioning polarizer 65 so that its polarization angle matches either the polarization angle of polarizer 52 or polarizer 54. In the Figures, arrow 49 illustrates light polarized parallel to the y-axis and arrow 51 illustrates light polarized parallel to the x-axis. FIG. 15 illustrates polarizer 65 in the first operational position shown in FIG. 13 which permits only light reflecting from page 20 to transmit therethrough. In contrast, FIG. 16 illustrates polarizer 65 in the second operational position shown in FIG. 14 which permits only light reflecting off of page 22 to transmit therethrough.

Figure 17:
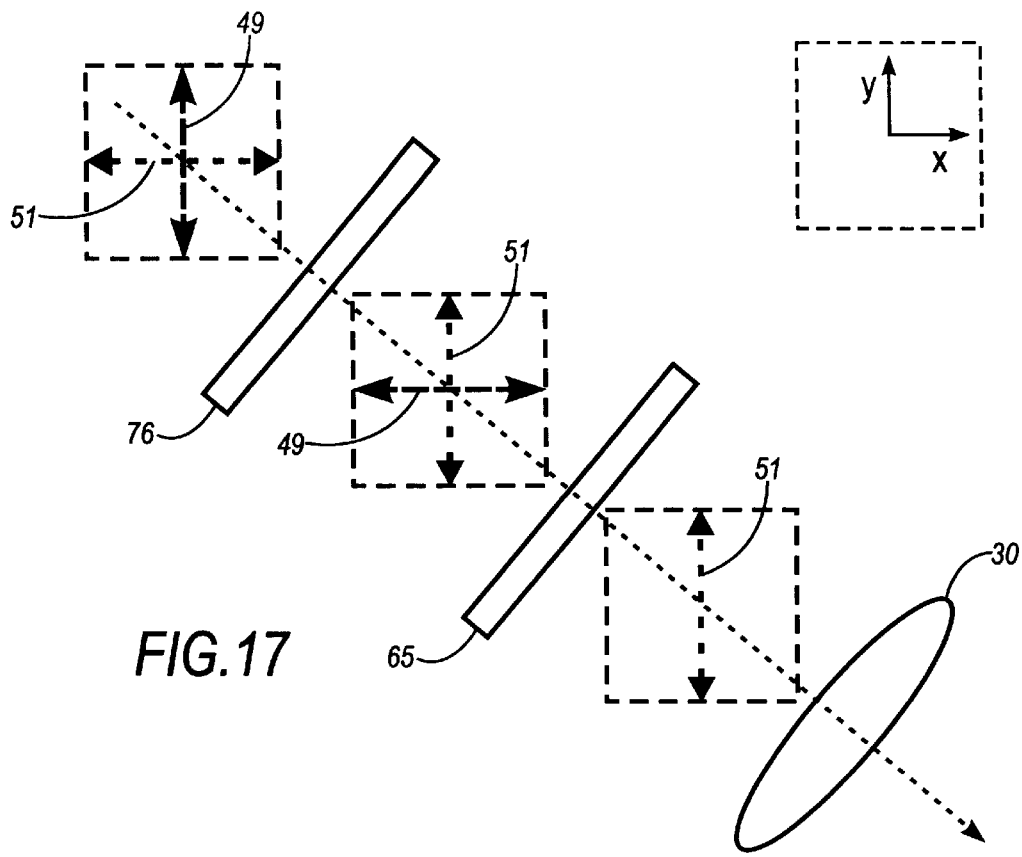
FIGS. 17 and 18 illustrate an alternate embodiment of the polarizer 65 shown in FIGS. 15 and 16.
Figure 18:
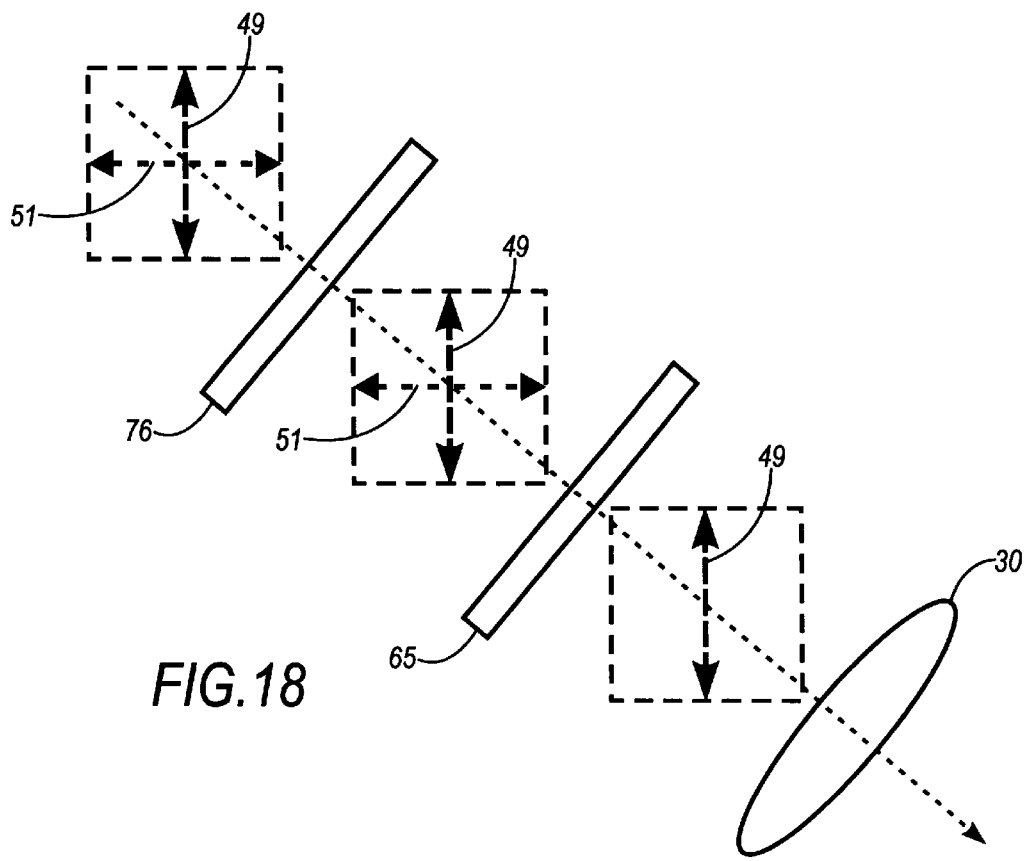

FIGS. 17 and 18 show another alternate embodiment in which polarizer 65 not rotated. In this embodiment a half wave plate 76 is positioned in front of polarizer 65 as shown in FIGS. 17 and 18. The half wave plate 76, which can be formed using either liquid crystal or electro-optics, rotates polarized light incident thereon to a predetermined angle consistent with either polarizer 52 or 54. In accordance with the present invention, in a first operational position half wave plate 76 is electrically biased to rotate polarized light ninety degrees, as illustrated in FIG. 17. The resulting "rotated" polarized light has a polarization angle that lines up with the polarizer 65 so that the light passes therethrough. In a second operational position, half wave plate 76 is electrically biased so that polarized light incident thereon is not rotated, as shown in FIG. 18. The resulting non-rotated polarized light is then filtered by polarizer 65 permitting light polarized at a different angle to pass therethrough. Consequently, both sides of bound document 6 are recorded using a single imager.

Figure 19:
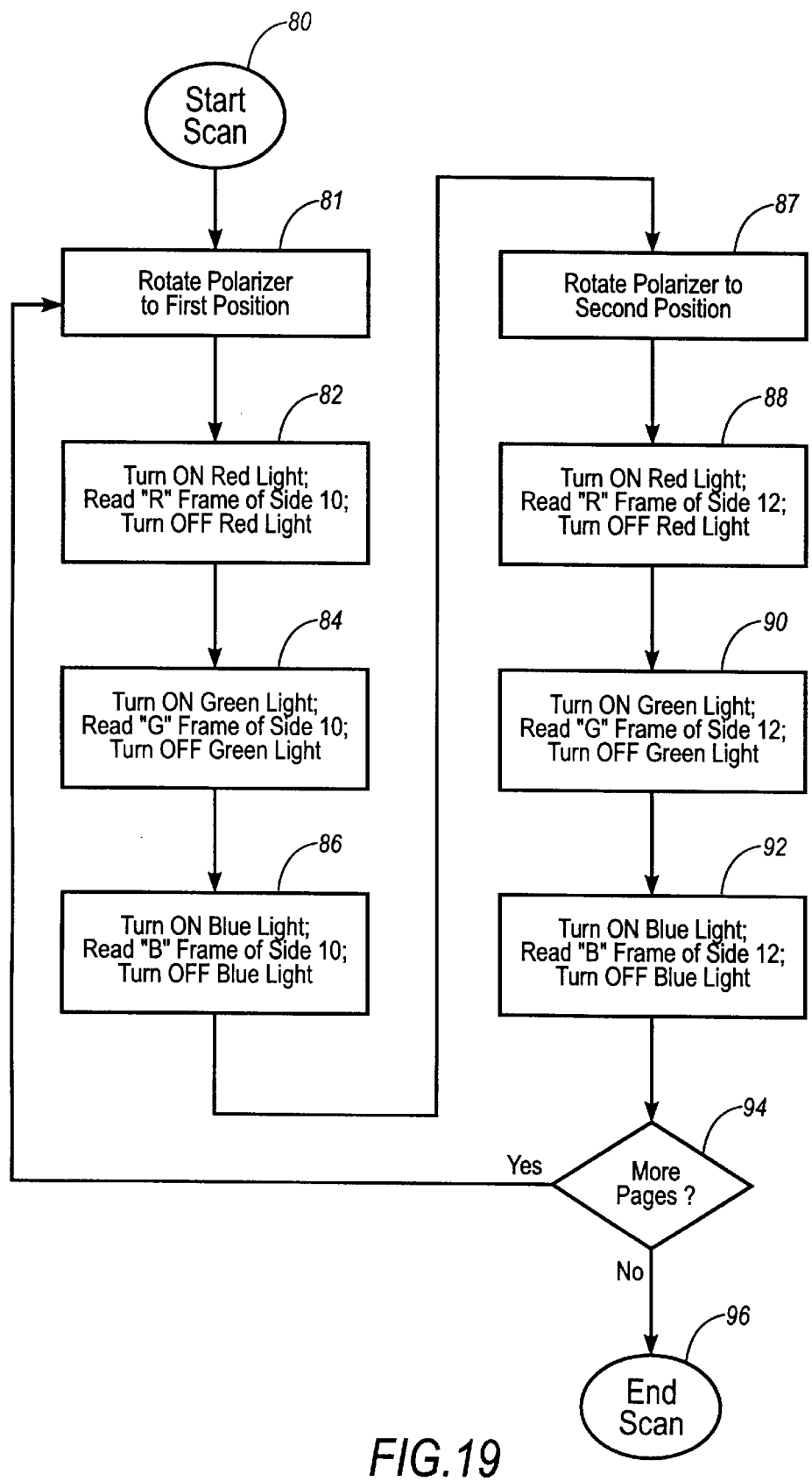
FIG. 19 is a flow chart showing the general steps involving the operation of the alternate embodiment of the scanning system shown in FIGS. 9 and 10.

FIG. 19 is a flow diagram of the operational control steps of the alternate embodiment scanning system 4 shown in FIGS. 9 and 10. The operational steps in FIG. 19 are equivalent to the steps shown in FIG. 8 except for the addition of steps 81 and 87. At step 81, the polarizer is mechanically rotated into the first operational position as shown in FIG. 13. After completing steps 88, 90, and 92, an image having both intensity and color hue of side 20 of document 6 is recorded on storage device 40. At step 87, the polarizer 65 is rotated into the second operational position as shown in FIG. 14. Subsequently, at steps 88, 90, and 92 an image having both intensity and color hue of side 22 of document 6 is recorded on storage device 40. In the alternate embodiment shown in FIGS. 17 and 18, steps 81 and 87 are substituted with steps that apply different biases to half wave plate 76 to produce the analogous effect of rotating polarizer 65 mechanically.

Figure 20:
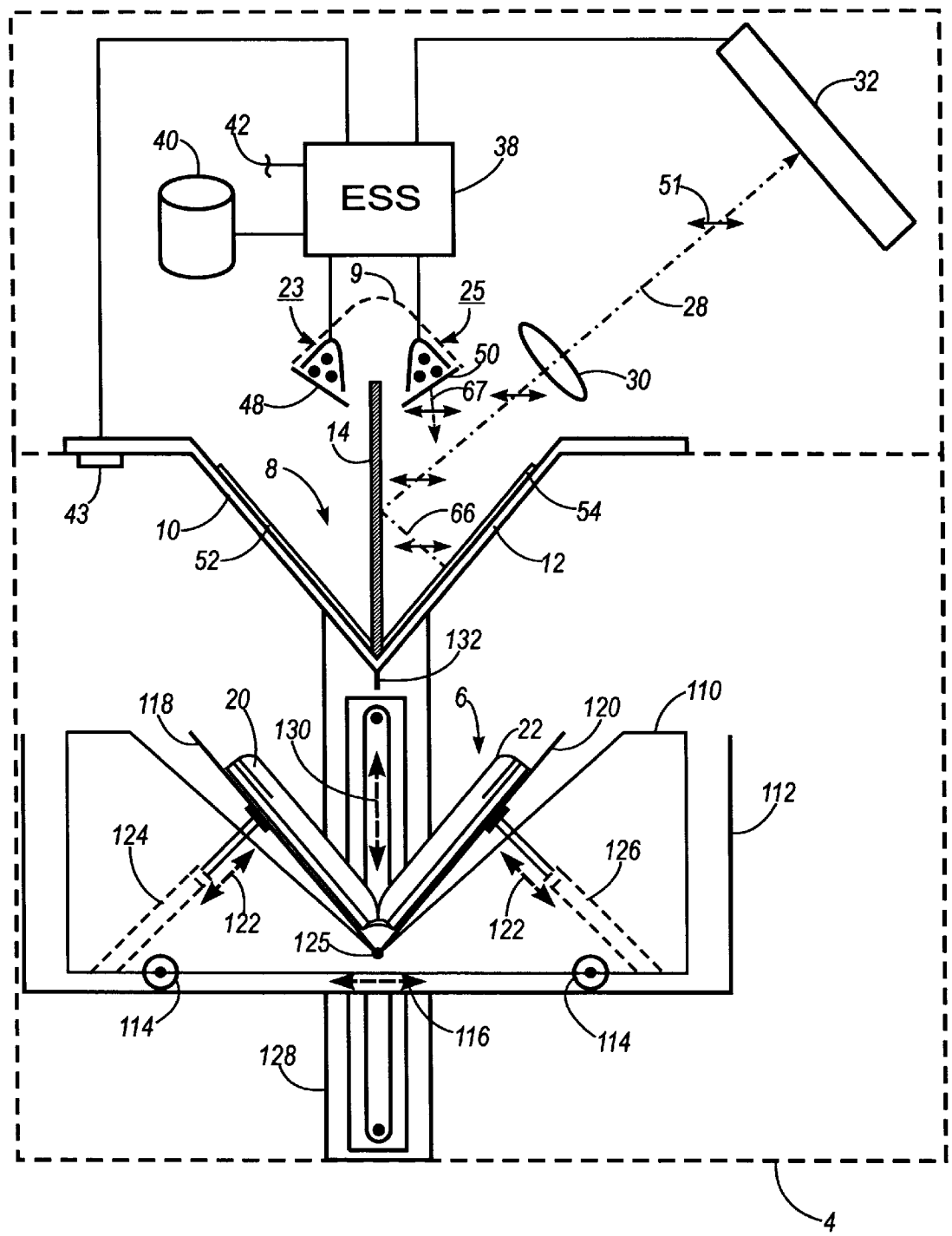
FIG. 20 is an alternate embodiment of the present invention in which a bound document is scanned in an open and upright position.

FIG. 20 is an alternate embodiment incorporating the invention in which scanning system 4 is inverted relative to scan bound document 6 in an open and upright position. In this embodiment, scanning system 4 includes a carriage 110 that is supported in a seating cavity 112. Rollers 114 move the carriage 110 laterally relative to the seating cavity 112 as indicated by arrow 116. The lateral movement of carriage 110 insures that the center of bound document 6 between sides 20 and 22, which varies depending on which pages to which bound document 6 are open, is centered in the middle of wedge platen 8. A pair of pivotally mounted support plates 118 and 120 are each secured to the carriage 110 by pistons 124 and 126, respectively, for angular movement about edge 125 as indicated by arrows 122. A drive assembly 128 moves the seating cavity 112 in a direction indicated by arrow 130. A position sensor 132 located at the apex of wedge platen 8 is retractable therein upon contact with bound document 6. ESS 38 communicates with drive assembly 128 to move seating cavity 112 vertically relative to wedge platen 8, and with rollers 114 to move the carriage laterally relative to the seating cavity 112. In response to a start scan signal from start scan switch mechanism 43, ESS 38 controls movement of the drive assembly 128 and rollers 114 to position bound document 6 is in contact with wedge platen 8 for scanning. In addition, ESS actuates pistons 124 and 126 to ensure that pages of bound document 6 are firmly in contact with each side of wedge platen 8. Once each side of bound document 6 has been recorded by imager 32, ESS 38 actuates drive assembly 128 to lower seating cavity 112 away from wedge platen 8.

It should be understood by those skilled in the art that position sensor 132 can alternatively be a magnetic or capacitive proximity sensor, or an optical detector. It will further be appreciated that scanning system 4 can be modified to incorporate functions a system that automatically turns pages of a bound document. Examples of systems that turn pages of bound documents are disclosed by Turner et al. in U.S. patents applications Ser. No. 08/570,880 entitled "Bound Document Imager with Page Turner" to Turner et al., filed on Dec. 12, 1995 and assigned to the same assignee as the present invention, and U.S. patent application Ser. No. 08/570,791, which are incorporated herein by reference.

It will no doubt be appreciated that there are a number of possible manners in which to implement the scanning system 4. In summary, the present invention includes a wedge shaped platen having positioned therebetween a beamsplitter or two-way mirror. In addition, the present invention includes polarizers that polarize light at two different angles. It will be readily understood by those skilled in the art that there exist a number of different angles at which light can be polarized orthogonal to each other in order to achieve the desired effect of polarizing light at one angle on one side of the beamsplitter and at another angle on the other side of the beamsplitter. This aspect of the present invention provides that opposing pages of a bound document can be recorded sequentially using a single page imager. Furthermore, the invention includes an active or passive imaging system that detects pages of a bound document reflected thereon. The imager can be formed using active or passive devices that include: a two-dimensional array of amorphous silicon sensors, a one or two dimensional CCD array, a photoreceptor, or photographic film. It will further be understood by those skilled in the art that reductions and enlargements of a side of bound document 6 can be achieved by altering the position and makeup of optics 30. It will also be appreciated by those skilled in the art that optics 30 are generally depicted in Figures. The optics 30 may be a traditional combination of lenses, apertures, mirrors and other optical elements designed to focus, reduce, enlarge, or fold images from sides 20 and 22 of wedge shaped platen 6 onto imager 32. It will be understood by those skilled in the art that magnification or reduction can be performed either by digital image processing techniques or by moving the combination of lenses forming optics 30.

It will also be appreciated that scanning system 4 can be readily modified to include job level programming as described by Rourke et al. in U.S. patent application Ser. No.

5,119,206. Job level programming can include programming that manages input scanning as well as output rendering. Programming options for scanning bound documents include input commands for specifying whether to scan one or both sides of a bound document. Programming options for rendering scanned images of a bound document include specifying whether opposing sides of a bound document are to be printed on a common print media sheet or on separate print media sheets.

Sequential control of scanning system 4 in ESS 38 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. An apparatus for scanning a bound document, comprising:
    a wedge shaped platen having a first transparent surface and a second transparent surface for supporting the bound document in an open condition;
    a light source for illuminating a first opposing page and a second opposing page of the bound document positioned on the first and the second transparent surfaces of said wedge shaped platen;
    a first polarizer for polarizing light emitted by said light source to illuminate the first opposing page with light polarized at a first angle;
    a second polarizer for polarizing light emitted by said light source to illuminate the second opposing page with light polarized at a second angle;
    an imager for recording the first and the second opposing pages of the bound document on said wedge shaped platen one page at a time; and
    a beamsplitter positioned in a defined transmissive optical path between the first transparent surface and said imager, and a defined reflective optical path from the second transparent surface and said imager, said beamsplitter transmitting onto said imager light polarized at the first angle and reflecting onto said imager light polarized at the second angle.

2. An apparatus according to claim 1, further comprising a controller for sequentially illuminating the first opposing page of the bound document with light polarized at the first angle and the second opposing page of the bound document with light polarized at the second angle to expose the first and the second opposing pages of the bound document on said imager.

3. An apparatus according to claim 1, further comprising a storage medium communicating with said controller for storing an image from said imager representing the first opposing page and an image representing the second opposing page of the bound document.

4. An apparatus according to claim 1, wherein said imager comprises a photoreceptor.

5. An apparatus according to claim 1, wherein said imager is a two-dimensional array of amorphous silicon sensors.

6. An apparatus according to claim 1, wherein the angle between the first transparent surface and the second transparent surface of said wedge shaped platen is less than ninety degrees.

7. An apparatus according to claim 1, further comprising a lens for projecting an image of the first opposing page and the second opposing page of said bound document onto said imager.

8. An apparatus according to claim 1, wherein said beamsplitter reflects approximately 50% and transmits approximately 50% of light incident thereon.

9. An apparatus according to claim 1, wherein said light source comprises a first and a second light source, the first light source illuminating the first transparent surface and a second light source illuminating the second transparent surface.

10. An apparatus according to claim 1, wherein said light source selectively emits red light, green light, and blue light.

11. An apparatus according to claim 1, wherein said first polarizer filters polarized light having the second angle and said second polarizer filters polarized light having the first angle.

12. An apparatus according to claim 1, wherein the first angle is orthogonal to the second angle.

13. An apparatus according to claim 1, further comprising a third polarizer for transmitting only light polarized at the first angle.

14. An apparatus according to claim 1, wherein said first polarizer is mounted in front of said first transparent surface of said wedge shaped platen.

15. An apparatus according to claim 1, wherein said second polarizer is mounted in front of the second transparent surface of said wedge shaped platen.

16. An apparatus according to claim 9, further comprising:
    a third polarizer for polarizing light emitted from the first light source at the first angle; and
    a fourth polarizer for polarizing light emitted from the second light source at the second angle.

17. An apparatus according to claim 13, wherein said third polarizer is mounted on focal optics directed at said imager.

18. An apparatus according to claim 17, wherein said third polarizer may be rotated to transmit only light polarized at the second angle.

19. An apparatus according to claim 17, further comprising a half wave plate for rotating light polarized at the second angle to equal light polarized at the first angle in response to application of an electronic signal.

20. An apparatus according to claim 19, wherein said half wave plate includes a liquid crystal material.

21. An apparatus according to claim 19, wherein said half wave plate includes electro-optic materials.

22. A method for scanning a bound document supported on a wedge shaped platen having a first transparent surface and a second transparent surface, comprising the steps of:
    (a) positioning a beamsplitter in a defined transmissive optical path between the first transparent surface and an imager, and a defined reflective optical path from the second transparent surface to the imager;
    (b) illuminating a first opposing page of the bound document positioned on the first transparent surface of the wedge shaped platen with light polarized at a first angle;

(c) recording with the imager a representation of the first opposing page illuminated along the defined transmissive optical path;

(d) illuminating a second opposing page of the bound document positioned on the second transparent surface of the wedge shaped platen with light polarized at a second angle; and (e) recording with the imager a representation of the second opposing page illuminated along the defined reflective optical path.

23. The method according to claim 22, further comprising the step of detecting a start scan signal.

24. The method according to claim 22, further comprising the step of turning a page of the bound document after completing steps (b) through (e).

25. The method according to claim 22, wherein said steps (b) through (e) are repeated for each of three primary colors red, green, and blue.

26. The method according to claim 23, further comprising the step of repeating steps (b) through (e) in response to said detecting step.

27. The method according to claim 24, further comprising the steps of repeating steps (b) through (e) after completing said page turning step.

28. The method according to claim 25, further comprising the step of forming a composite image using each image recorded for the three primary colors red, green, and blue.

29. An apparatus for scanning a bound document, comprising:

a wedge shaped platen having a first transparent surface and a second transparent surface for supporting the bound document in an open condition;

a light source for illuminating a first opposing page and a second opposing page of the bound document positioned on the first and the second transparent surfaces of said wedge shaped platen;

means for polarizing light emitted by said light source to illuminate the first opposing page with light polarized at a first angle, and the second opposing page with light polarized at a second angle;

means for recording the first and the second opposing pages of the bound document on said wedge shaped platen one page at a time; and a two-way mirror positioned in a defined transmissive optical path between the first transparent surface and said imager, and a defined reflective optical path from the second transparent surface and said imager, said beamsplitter transmitting onto said imager light polarized at the first angle and reflecting onto said imager light polarized at the second angle.

* * * * *